United States Patent [19]

Malik

[11] Patent Number: 4,592,667
[45] Date of Patent: Jun. 3, 1986

[54] METHOD AND APPARATUS FOR MINIMIZING EFFECT OF HARD SPOTS IN ROTATING FRAME STRUCTURE OF MINING MACHINE ON ROLLER BEARINGS

[75] Inventor: Dev R. Malik, Marion, Ohio

[73] Assignee: Dresser Industries, Inc., Dallas, Tex.

[21] Appl. No.: 796,932

[22] Filed: Nov. 12, 1985

[51] Int. Cl.⁴ .................... F16C 19/30; F16C 27/08
[52] U.S. Cl. .................................................. 384/593
[58] Field of Search ............... 384/593, 594, 592, 421, 384/422; 29/148.4 A

[56] References Cited

U.S. PATENT DOCUMENTS

| | | | |
|---|---|---|---|
| 1,678,871 | 7/1928 | O'Connor | 384/594 |
| 4,236,863 | 12/1980 | Baron | 384/593 |
| 4,239,305 | 12/1980 | Baron | 384/593 |
| 4,395,140 | 7/1983 | Sable | 384/593 |

*Primary Examiner*—Lenard A. Footland
*Attorney, Agent, or Firm*—Sigalos & Levine

[57] ABSTRACT

A novel construction for mounting the roller circle system for power mining equipment and the like between the rotating portion and the base portion of the power mining device so as to minimize the adverse effects on roller bearings of hard spots caused by the intersection of bulkheads or ribs which strengthen the rotating frame and the base.

16 Claims, 9 Drawing Figures

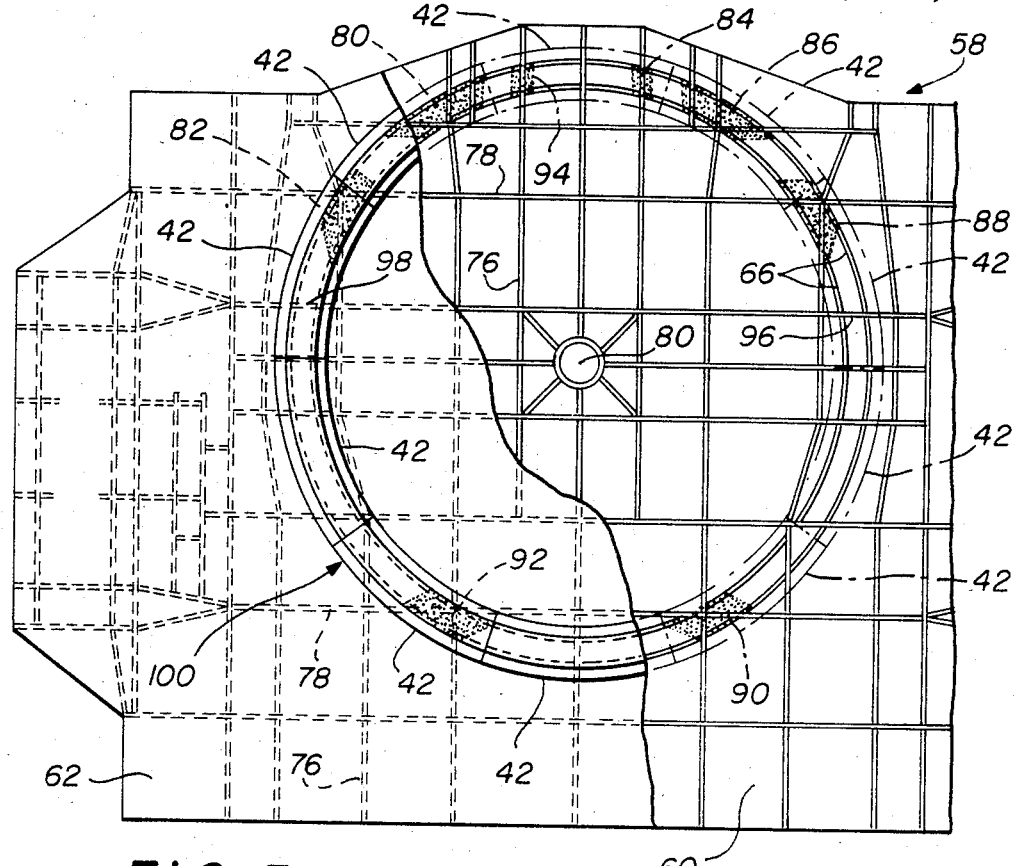
FIG. 3
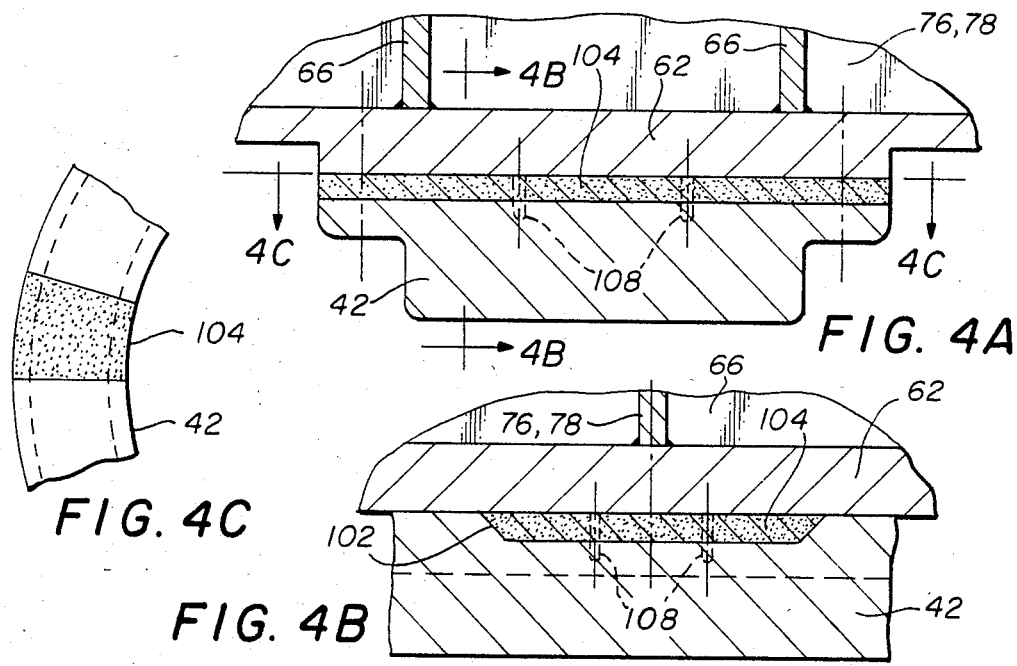
FIG. 4C
FIG. 4A
FIG. 4B

METHOD AND APPARATUS FOR MINIMIZING EFFECT OF HARD SPOTS IN ROTATING FRAME STRUCTURE OF MINING MACHINE ON ROLLER BEARINGS

BACKGROUND OF THE INVENTION

This invention relates to a frame construction and more particularly to a frame construction suitable for use in power mining equipment and the like such as drag lines, stripping shovels, loading shovels, cranes, and the like. In particular, this invention contemplates a novel construction for mounting the roller circle system between the rotating portion and the base portion of the power mining device so as to minimize the adverse effects on roller bearings of hard spots caused by the intersection of bulkheads or ribs which strengthen the rotating frame and the base.

Generally speaking, heavy duty power machines in the prior art have consisted of a lower frame or base adapted to be seated on the ground, a bearing roller circle mounted on the lower frame, an upper rotatable frame mounted on the roller circle for swing movement relative to the lower frame or base, a boom mounted on the front end of the upper frame supporting a drag line bucket, shovel or the like, a gantry and possible a mast mounted on the upper frame for supporting the boom by means of pendants and associated machinery mounted on the upper frame for operating the drag line bucket, shovel or the like, swinging the upper frame and propelling the machine.

Traditionally, both the upper frame and the lower frame or base have consisted of an outer wall, a grid structure disposed within the outer wall including a plurality of longitudinally and transversely disposed frame members or bulkheads welded together and to the outer wall, and upper and lower plates welded to the grid structure. A plurality of arcuate, vertical ribs rigidly interconnect the transverse bulkheads and longitudinal ribs and are disposed concentrically relative to the center journal about which the upper frame rotates to form a reinforced circular path or pad for supporting the upper or lower bearing rail of the roller bearing assembly.

It is well known that the eccentric load imposed by the boom or a combination of a boom and a dipper handle and the limited arc of travel of the upper frame of these machines during normal operation, results in the application of non-uniform and highly concentrated loads on small segments of the bearing roller circles of such machines. Unless certain measures are taken to alleviate such highly concentrated loads and the high stresses developed by such loads, the rails and/or roller bearings begin to deteriorate and they eventually fail. The failure of rails and roller bearings of large machines is a costly matter. Where such failure occurs, the machine must be taken out of service thus adversely affecting its productivity and the rails and/or roller bearings must be replaced which are costly in materials and labor.

In the prior art, several approaches have been taken to reduce rail and roller failure and thus prolong the service life of the roller bearings. Rails and roller bearings have been redesigned. The metallurgy of rails and roller bearings has been improved. More recently it has been proposed to install a cushioning material such as rubber, neopreme or polyurethane between the upper rail and the upper frame and/or between the lower rail and the lower frame principally for the purpose of more uniformly distributing load imposed on the roller circle over a greater arc thereby including a greater number of rail segments and roller bearings.

However, still another problem exists in the construction of the upper and lower frames which causes a deleterious effect upon the roller bearings which has not been solved by the prior art. In the construction of the grid structures forming the upper frame and the base structures, the intersection of the transversely and longitudinally disposed bulkheads or ribs as well as the intersection of the arcuate vertical ribs forming the reinforced circular path for mounting the upper and lower bearing rails create "hard spots" in the structure and thus the grid is more rigid or stiff at these points than elsewhere.

Front end loads and the weight of the machine, when applied at various points on the rotating frame structure, are transferred to ground supports under the base or lower frame through the bearing rails and the roller circle bearing rollers. Bearing roller load distribution and maximum bearing roller load carried by any bearing roller depend upon the stiffness of the rotating frame and the base frame structures in the roller path. Thus, the rotating frame, the base frame, the bearing roller circle and the ground support system can be viewed as four springs of different spring rate or stiffness connected in series. The combined stiffness of the system at any point in the bearing roller path determines the load carried by the roller bearing at that point. The spring rate or stiffness of the rotating frame along the roller circle support varies and is comparatively stiffer at an intersection of one or more of the bulkheads with the annular roller support bulkhead.

Thus, peak roller loads of two and one-half to three times the magnitude of normal roller load result when the bearing roller is positioned between a "hard spot" on the rotating frame and the base frame. Fatigue life of the bearing rails, the rollers, and the rib intersections under the bearing rails in the base frame as well as in rotating frame can be improved by softening some of the "hard spots" in the rotating frame and/or the base frame where the roller circle support bulkheads or ribs intersects one or more of the transverse and longitudinal bulkheads or ribs. By sandwiching a brass plate or a plate of any other metal softer than steel between the bearing rail and upper rotating frame or base in the hard spot areas will result in a reduction of stiffness in those areas. Reduced stiffness of the rotating frame structure or base frame in the hard spot areas will result in a more uniform stiffness in the roller path and thus reduce peak loads by disbursing peak loads on adjacent rollers.

Thus, it is a principal object of the present invention to reduce the stiffness of the rotating frame structure or the base frame in hard spot areas thereby reducing bearing failure and frame structure failure in those areas.

It is still another object of the present invention to sandwich a material softer than steel such as brass between the bearing rails and the frame structure in hard spot areas to obtain the resulting reduction of stiffness in those hard spot areas.

It is also an object of the present invention to form a recess in the rail segments that are positioned over selected bulkhead intersections causing the hard spots and inserting a brass plate in said recess and rigidly attached to the rail segment whereby a reduced relative stiffness between the hard spots and the bearing rollers occur.

It is yet another object of the present invention to form a recess in the underside of the bottom plate of the rotating frame over selected bulkhead intersections forming the hard spots and attaching a plate of softer material such as brass in the recess between the rotating frame and the upper rail segments whereby the deleterious effects of the hard spots on the bearings are minimized by an overall reduction in stiffness.

It is a further object of the present invention to form a recess in the upper surface of the base upper plate over selected ones of the bulkhead intersections forming the hard spots and attaching a plate of metal softer than steel in the recess between the base and the lower rail segments whereby the deleterious effects of hard spots on the bearings are minimized by an overall reduction in stiffness.

SUMMARY OF THE INVENTION

Thus, the present invention relates to an improvement in apparatus for minimizing the effect of hard spots on bearing rollers in a mining machine frame having a steel base, including upper and lower plates, supporting a steel rotating frame, including upper and lower plates, on a bearing roller circle, said bearing roller circle comprising an upper segmented bearing rail attached to the underside of the lower plate of said rotating frame, a lower segmented bearing rail attached to the top surface of the plate of said base, a bearing assembly positioned between said upper and lower bearing rails for carrying said rotating frame, at least one annular steel bulkhead for strength rigidly attached to the top side of the lower plate of said rotating frame and congruent with said upper bearing rail, a plurality of second steel strengthening bulkheads intersecting said at least one annular bulkhead, at least some of said intersections causing hard spots having deleterious effects on said bearing rollers, at least one additional annular steel strengthening bulkhead rigidly attached to the underside of the top plate of said base and congruent with said lower rail assembly and a plurality of third steel strengthening bulkheads intersecting said at least one additional annular bulkhead, at least some of said intersections in said base causing hard spots having deleterious effects on said bearing rollers, the improvement comprising a bearing rail segment positioned over at least some of said locations of said intersecting bulkheads causing said hard spots and a plate of metal softer than said steel positioned between at least some of said bearing rail segments and said bulkhead intersections whereby the deleterious effects of said hard spots on a bearing caused by said bulkhead intersections are minimized by an overall reduction of stiffness caused by said material.

The present invention also relates to an improved method for minimizing the effect on bearing rollers of hard spots in a mining machine frame having a steel base, including upper and lower plates, supporting a steel rotating frame, including top and bottom plates, on a bearing roller circle, said bearing roller circle comprising an upper segmented bearing rail attached to the underside of the lower plate of said rotating frame, a lower segmented bearing rail attached to the upper surface of said upper plate of said base, a bearing assembly positioned between said upper and lower bearing rails for carrying said rotating frame, at least one annular steel bulkhead for strength rigidly attached to the upper side of the lower plate of said rotating frame and congruent with said upper bearing rail, a plurality of second steel strengthening bulkheads intersecting said at least one annular bulkhead, at least some of said intersections causing hard spots having deleterious effects on said bearing rollers, at least one additional annular steel strengthening bulkhead rigidly attached to the underside of the upper plate of said base and congruent with said lower rail assembly and a plurality of third steel strengthening bulkheads intersecting said at least one additional annular bulkhead, at least some of said intersections causing hard spots having deleterious effects on said bearing rollers, the improvement comprising the steps of positioning a bearing rail segment over at least some of said locations of said intersecting bulkheads causing said hard spots, and positioning a plate of metal softer than said steel between at least some of said bearing rail segments and said bulkhead intersections whereby the deleterious effects of said hard spots on a bearing caused by said bulkhead intersections are minimized by an overall reduction of stiffness caused by said material.

BRIEF DESCRIPTION OF THE DRAWINGS

These and other objects of the present invention will be disclosed more fully in conjunction with the accompanying drawings in which like numbers represent like elements and in which:

FIG. 3 is a plan view of the construction of the upper rotating frame illustrating the grid structure formed by intersecting longitudinal and transversely disposed bulkheads as well as the intersection of the arcuate vertical support ribs for the roller circle with the transverse and longitudinal bulkheads to cause hard spots;

FIG. 4A is a cross-sectional view illustrating a portion of the upper frame assembly with the vertically extending roller circle support bulkheads attached to the upper side of the bottom plate and intersecting with the longitudinal or transverse bulkhead to create the hard spot, an upper rail segment positioned over the intersection causing the hard spot and a plate of material softer than steel, such as brass, inserted in a recess in the upper rail segment and positioned between the upper rail segment and the bottom side of the bottom plate of the rotating frame thereby minimizing the deleterious effect of the hard spot by causing an overall reduction in stiffness in the area;

FIG. 4B is a cross-sectional view taken along the lines 4B—4B in FIG. 4A;

FIG. 4C is a top view of one of the rail segments taken along lines 4C—4C FIG. 4A illustrating the soft material insert in the rail segment;

DETAILED DESCRIPTION OF THE DRAWINGS

Figure 1:
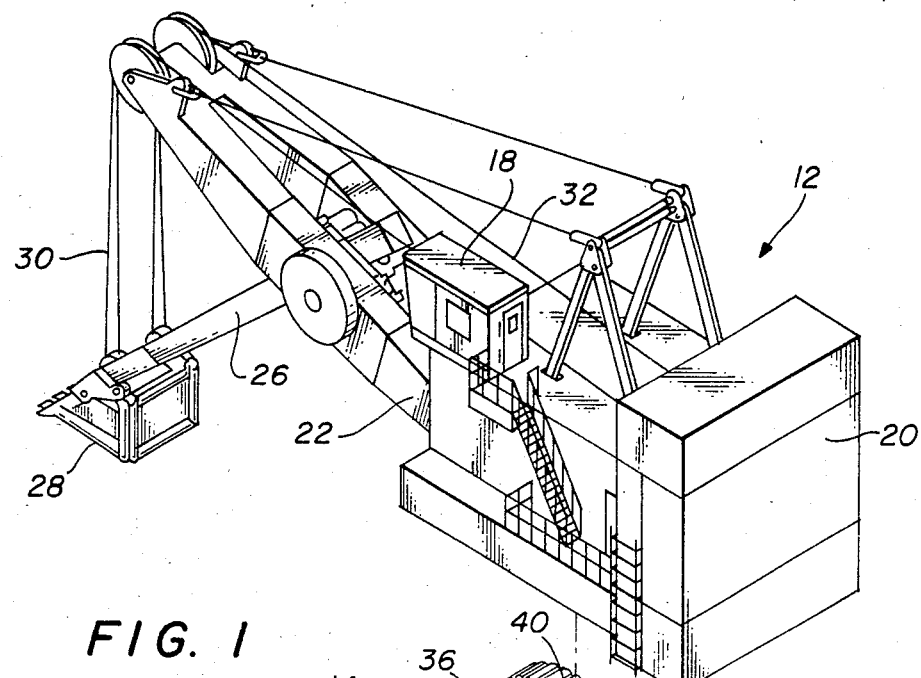
FIG. 1 is a diagrammatic side view representation of a partially exploded view of a typical heavy duty machine such as a power mining shovel.

FIG. 1 is a diagrammatic side view representation of a typical power machine such as a power mining shovel which has a lower stationary portion (10) and an upper rotatable portion (12) coupled to the stationary portion (10) by means of a swing gear and bearing assembly (14). The lower stationary portion (10) is mounted on tracks (16) which allow forward or reverse motion of the entire machine. The upper rotatable portion (12) includes an operator's cab (18) and equipment housing (20). A boom (22) is coupled to the housing (20) at a pivot point (not shown) and has attached thereto an arm or handle (26) to the end of which is attached a bucket or dipper (28) which cuts loose and accumulates the material which is to be removed by the shovel. Appropriate cables (30) and (32) allow movement of the bucket (28) in the vertical plane. Of course, appropriate motors are utilized to operate the cables (30) and (32) and the arm (26) to allow the bucket (28) to be positioned properly to remove the materials involved. In addition, of course, the upper frame assembly (12) rotates 360° to allow the bucket (28) to be placed wherever it is needed to remove material.

Swing gear and bearing assembly (14) includes a swing gear (38) rigidly attached to the lower frame assembly (10) and concentrically located with respect to center journal (40) which serves as the rotatable pivot point for the upper frame assembly (12). A roller bearing (36) is associated with the gear (38) and absorbs the load placed thereon by the upper frame assembly (12).

Figure 2:
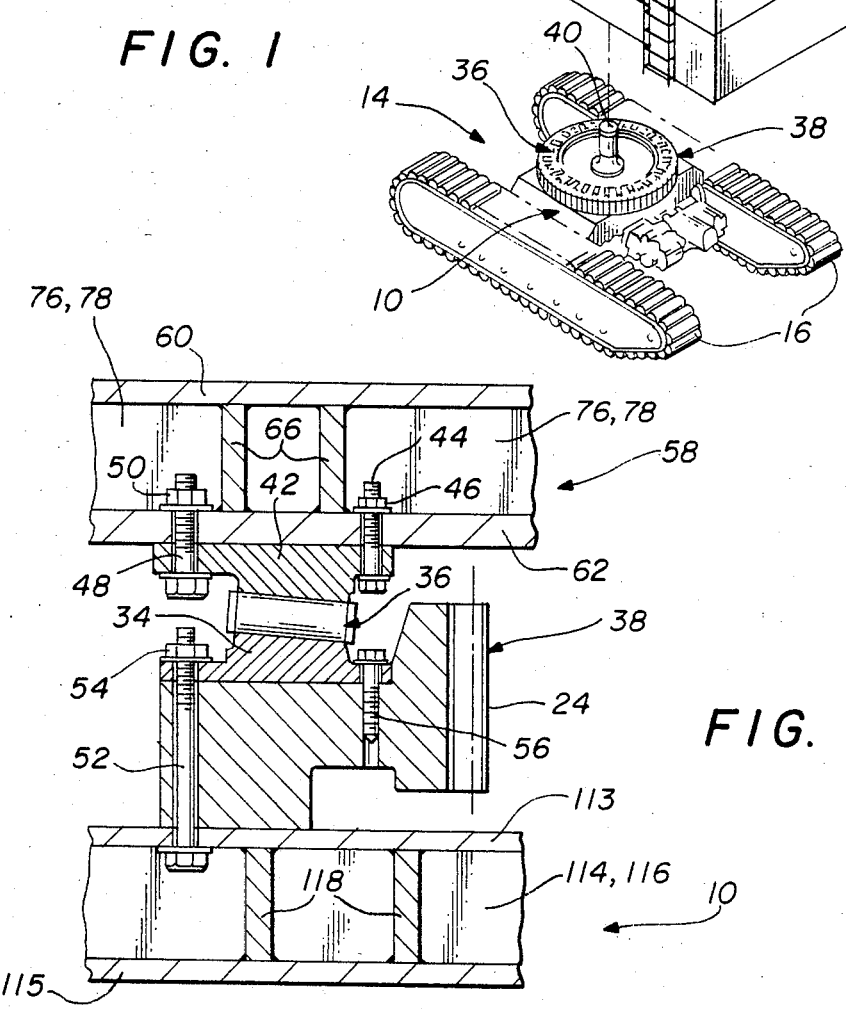
FIG. 2 is a cross-sectional view of the swing gear and roller bearing assembly illustrating how the roller bearing assembly is positioned between upper and lower bearing rails to bear the rotatable load during relative rotation of the upper frame assembly and the base and also illustrates how the intersecting reinforcing bulkheads occur above and below the bearings to create hard spots.

A cross-sectional view of the entire swing gear and bearing assembly (14) as it is positioned between and absorbs the load of the upper frame assembly (12) with respect to the lower frame or base assembly (10) is shown in FIG. 2. As can be seen in FIG. 2, swing gear (38) has gear teeth (24) on the outer periphery thereof and has also attached thereto on the upper portion thereof a lower bearing rail segment (34). A roller bearing (36) is located between the lower bearing rail segment (34) and an upper bearing rail segment (42). Upper bearing rail segment (42) is attached to the underside of the lower plate (62) of upper rotatable frame (12) by means of bolt (44) and nut (46) and bolt (48) and associated nut (50). In like manner, swing gear (38) is rigidly attached to the upper surface of the upper plate (113) of lower frame assembly (10) by means of bolt (52) and associated nut (54) which also hold the lower bearing rail segment (34) rigidly attached thereto. In addition, bolt (56) also assists in holding the lower bearing rail assembly (34) rigidly attached to the swing gear assembly (38). Thus, bearing (36) supports the rotating frame assembly (12) and allows it to rotate with respect to base frame (10).

It will be noted that a grid structure (58) forms a portion of the upper rotating frame structure (12) and includes upper and lower plates (60) and (62) attached to and held in spaced relationship by a plurality of transversely disposed bulkheads or ribs (78) and longitudinal disposed bulkheads or ribs (76). Upper roller circle support bulkheads or ribs (66) rigidly interconnect the transverse bulk heads (78) and longitudinal bulkhead or ribs (76) and are disposed concentrically relative to the center journal to form a support for the circular path on which the upper bearing rails (42) are mounted. Because of the extra support caused by the upper roller circle support bulkheads or ribs (66) where they intersect with the longitudinal or transverse ribs (76) and/or (78), a hard spot occurs, relative to other areas along the path, which is so stiff that peak loads may be applied to any roller (36) that suddenly finds itself under one of these intersections.

In like manner, the base frame (10) is partially shown in FIG. 2 and is a grid structure having an upper plate (113) and a lower plate (115) separated by and joined by intersecting longitudinal and/or transverse bulkheads (114) and/or (116). In addition, at least one lower roller circle support bulkhead or rib (118) is formed in an annular path under the swing gear (38) which holds the lower bearing rail (34). Again, as explained in reference to the upper frame grid structure (58), the intersection of the lower roller circle bulkhead or rib (118) with the longitudinal and/or transverse intersecting bulkheads (114) and/or (116) creates the potential for hard spots which are rigid and unyielding to the forces applied to any bearing (36) which may be positioned over the hard spot.

FIG. 3 is a partial plan view of the bottom of the grid structure (58) forming part of the upper frame assembly (12) and illustrates the longitudinal bulkheads (76) and the intersecting transverse bulkheads (78) forming a grid between upper and lower plates (60) and (62) respectively and their relationship to the upper roller circle support bulkheads or ribs (66). As can be seen in FIG. 3, the upper rail segments (42) rest on lower plate (62) over support bulkheads or ribs (66) and form an annular circle about orifice (80) through which journal (40) is inserted and thus form an annular path for the bearings (36). It will be noted that as the roller circle support bulkheads or ribs (66) travel in the annular circle under the bearing rail segments (42), they periodically intersect the longitudinal ribs (76) and the transverse ribs (78). Such intersections are shown occurring at (80), (82), (84), (86), (88), (90), (92) and (94). While it is true that other intersections occur such as at (96), (98) and (100), those areas happen to be relatively unloaded and the hard spot occurring there does not have such an adverse effect on the bearings (36). Hard spots can be detected either by force measurements at each of the intersections or by force calculations which determine which of the intersections are adversely loaded due to the configuration of the machine.

At those intersections which are heavily loaded due to the configuration of the machine, such as at intersection (80) or (86), if the bearing (36) happens to be at intersection (80) or (86) when a heavy load occurs there, the additional rigidity or hard spot caused by the intersection of the longitudinal ribs (76), the transverse ribs (78) and the roller circle support ribs (66) creates such pressure that damage occurs to any bearing (36) that is loaded at that point. Thus, it is desirable to reduce the loading at that point in some manner. This may be accomplished with the present invention by placing at those rib intersections where hard spots occur and the bearings (36) receive greater than normal loads, a material that is softer than steel, such as brass, thus absorbing some of the load at that point. Therefore, it is desirable to place a soft metal such as brass in the areas which are shaded along the circular path traversed by the rollers on the upper rail segments (42).

FIG. 4A illustrates the manner in which the pad of soft metal, such as brass, could be placed between an upper rail segment (42) and the bottom surface of lower plate (62) of rotating frame (12) to provide reduced stiffness in a particular hard spot area thus resulting in a more uniform stiffness in the roller circle path at that point and thus reducing peak loads by disbursing those peak loads on adjacent rollers. As can be seen in FIG. 4B, upper rail segment (42) has an indentation or recess (102) formed therein in which a pad of metal (104) softer than steel, such as brass, is placed. It will be noted in FIG. 4A and FIG. 4B that the brass pad (104) is essentially under the roller circle bulkheads (66) which intersects with longitudinal rib (76) and/or transverse rib (78). Dowel pins (108) can be used to secure the brass plate insert (104) in the recess (102) of the upper rail segment (42). When a roller (36) applies pressure against the upper rail segment (42) shown in FIG. 4A, the stiffness of that point or intersection is reduced significantly because the soft brass yields somewhat thus reducing the overall stiffness of the area. The extra load can therefore be partially transferred to neighboring rollers (36).

As can be seen in FIG. 4B, which is a cross-sectional view taken along lines 4B—4B in FIG. 4A, the brass pad (104) is only of sufficient length necessary to cover the area under and on each side of the intersection of longitudinal and/or transverse ribs (76) and (78) with the roller circle bulkhead or rib (66). Thus, the underside of bearing rail segment (42) is machined in the selected area to form a recession (102) in which can be placed the brass plate inserts (104) and the rail segment (42) is then positioned on the bottom surface of lower plate (62) of the rotating frame (12) so as to locate the brass insert (104) in bearing rail segment (42) generally on the hard spots in the rotating frame roller support circle caused by the intersection of the roller circle bulkhead (66) with the longitudinal and/or transverse ribs (76) and (78) respectively.

FIG. 4C is a top view of one of the rail segments (42) showing an example of the brass plate insert (104) attached to and located thereon.

Figure 5A:
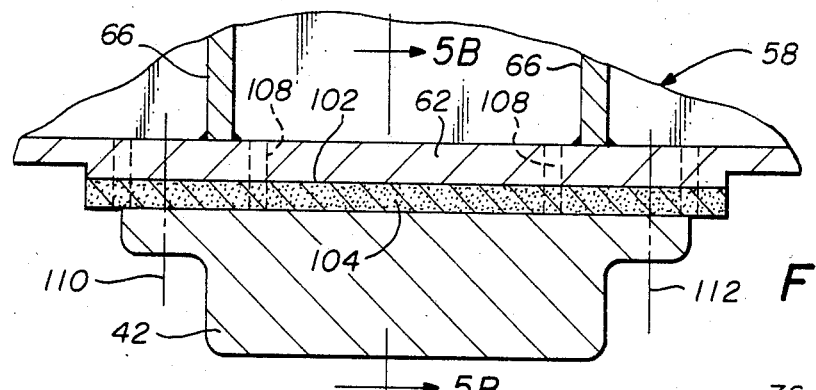
FIG. 5A is a cross-sectional view of an alternative embodiment of the present invention illustrating the rotating frame having the roller circle reinforcement bulkheads attached to the upper side of the bottom plate thereof and intersecting with the transverse or longitudinal rotating frame bulkhead which creates a hard spot and having a plate of metal material softer than steel, such as brass, attached to the upper rotating frame between the upper rotating frame bottom plate and the upper rail segment.
Figure 5B:
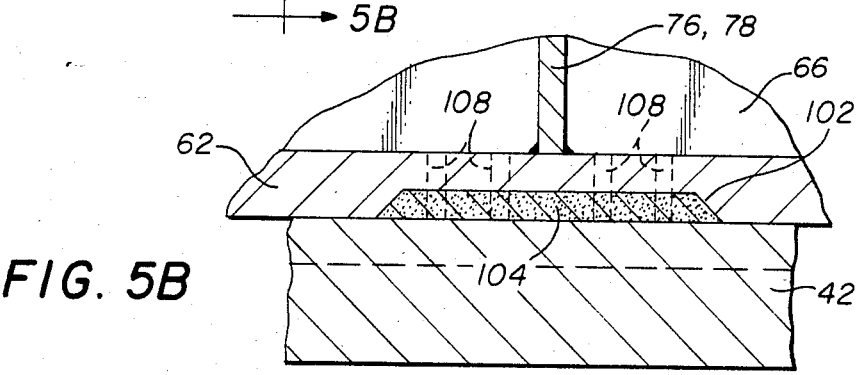
FIG. 5B is a cross-sectional view of the invention shown in FIG. 5A taken along lines 5B—5B.

An alternative method of inserting the brass pads between the upper rail segments (42) and the bottom side of lower plate (62) of the rotating frame (12) is illustrated in FIG. 5A and FIG. 5B. In this case, a recess (102) is machined in the bottom side of lower plate (62) of upper rotating frame structure (58) below the vertical bulkheads (66) which support the bearing roller circle in contact with lower plate (62). Brass plates (104) are installed in the recesses (102) as shown and secured with dowel pins (108) to the rotating frame lower plate (62). The upper rail segment (42) is then attached to the rotating frame lower plate (62) in the usual manner by means of bolts placed through orifices along center lines (110) and (112).

The recess (102) can be more clearly seen in FIG. 5B which is a cross-sectional view taken along lines 5B—5B in FIG. 5A. It will be noted that brass plate (104) is flush with the bottom surface of lower plate (62) of rotating frame (12) and does not extend beyond it. This is acceptable inasmuch as the brass plate (104) extends completely under the roller circle bulkheads (66) as shown in FIG. 5A and under and on each side of the longitudinal and/or transverse bulkheads (76), (78) thereby absorbing the load placed thereon and reducing the stiffness of the structure in that area thus reducing peak loads by disbursing peak loads on adjacent rollers.

Figure 6:
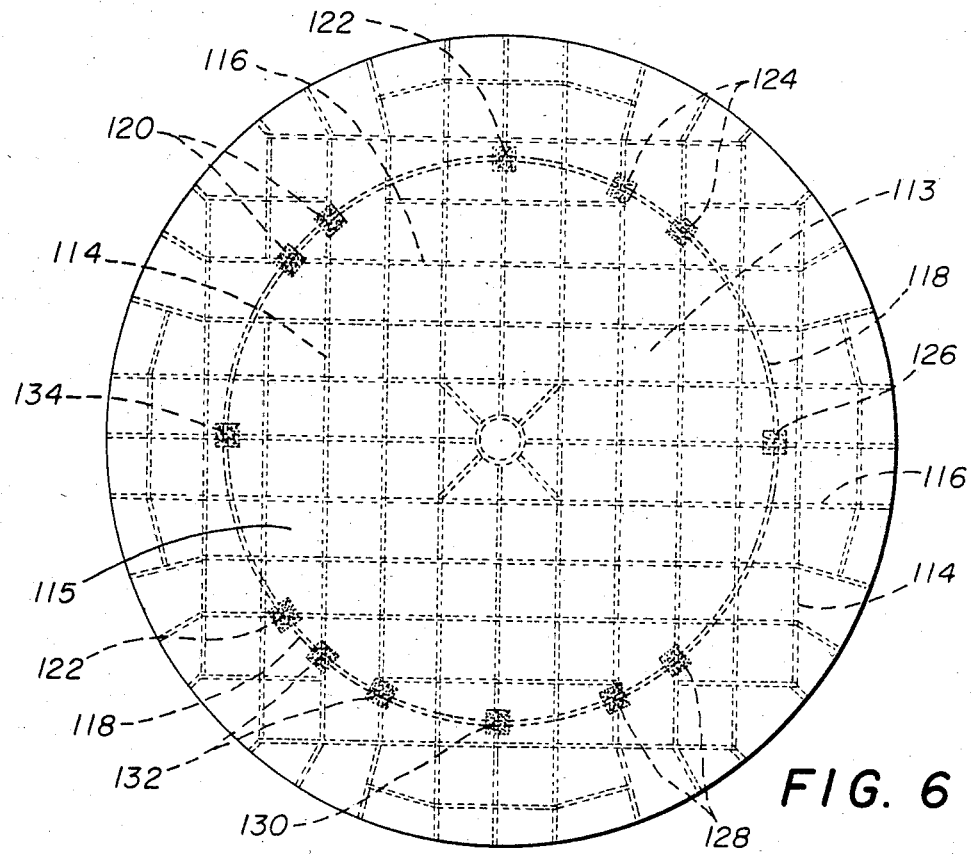
FIG. 6 is a plan view of the grid construction of the base frame structure illustrating the transversely and longitudinally disposed vertical ribs rigidly interconnecting each other and the arcuate vertical ribs supporting the roller circle thereby creating possible additional hard spots.

If desired, such brass pads (104) can also be placed over intersecting ribs in the grid network forming base portion (10) including upper plate (113) and lower plate (115) as illustrated in FIG. 6 to compensate for hard spots in intersecting areas as explained previously with respect to the rotating frame structure. In FIG. 6, it can be seen that the longitudinal ribs (114), the transverse ribs (116) and the roller circle bulk head or rib (118) intersect in areas such as, for example only, those designated by the numerals (120), (122), (124), (126), (128), (130), (132) and (134). Again, the precise areas which are producing the damage to bearings because of the hard spots can be determined by force measurements or calculations. Brass pads can be placed in those areas as desired in the manner described previously inasmuch as lower bearing segments (34) are placed on the top of upper plate (113) above and supported by the roller circle bulk head (118).

Thus, there has been disclosed a novel means for sandwiching a brass or other metal plate softer than steel between the bearing support rails and the upper or lower frame walls to provide a reduction of stiffness in hard spot areas which results in a more uniform stiffness in the roller path and thus reduces peak loads by disbursing peak loads on adjacent rollers.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined in the appended claims.

I claim:

1. In apparatus for minimizing the effect of hard spots on bearing rollers in a mining machine frame having a steel base, including upper and lower plates, supporting a steel rotating frame, including upper and lower plates, on a bearing roller circle, said bearing roller circle comprising an upper segmented bearing rail attached to the underside of the lower plate of said rotating frame, a lower segmented bearing rail attached to the top surface of the upper plate of said base, a bearing assembly positioned between said upper and lower bearing rails for carrying said rotating frame, at least one annular steel bulkhead for strength rigidly attached to the top side of the lower plate of said rotating frame and congruent with said upper bearing rail, a plurality of second steel strengthening longitudinal and transverse bulkheads intersecting said at least one annular bulkhead, at least some of said intersections causing hard spots having deleterious effects on said bearing rollers, at least one additional annular steel strengthening bulkhead rigidly attached to the underside of the plate of said base and congruent with said lower rail assembly and a plurality of third steel strengthening longitudinal and transverse bulkheads intersecting said at least one additional annular bulk head, at least some of said intersections causing hard spots having deleterious effects on said bearing rollers, the improvement comprising:

a. a bearing rail segment positioned over each location of said intersecting bulkheads causing said hard spot, and b. a plate of metal softer than said steel positioned between at least some of said bearing rail segments and said bulkhead intersections whereby the deleterious effects of said hard spots on a bearing caused by said bulkhead intersections are minimized by an overall reduction of stiffness caused by said material.

2. Apparatus as in claim 1 wherein said plate is formed of brass.

3. Apparatus as in claim 2 further including means for mounting one of said plates between each of said rail segments and a corresponding bulkhead intersection causing a hard spot.

4. Apparatus as in claim 3 further comprising:

a. means for forming a recess in said rail segments to be positioned over said bulkhead intersections causing said hard spots, and b. means rigidly mounting said brass plate in said recess of said rail segment whereby a reduced relative stiffness between said hard spot and said bearing rollers occurs.

5. Apparatus as in claim 4 wherein said rail segments are upper rail segments.

6. Apparatus as in claim 4 wherein said rail segments are lower rail segments.

7. Apparatus as in claim 3 further comprising:

a. means for forming a recess in said underside of said lower plate in said rotating frame over said bulkhead intersections forming said hard spots, and b. means for mounting said plate of brass in said recess between said lower plate of said rotating frame and said upper rail segments whereby the deleterious effects of said hard spot on said bearings are minimized by an overall reduction in stiffness.

8. Apparatus as in claim 3 further comprising:

a. means for forming a recess in said top surface of said upper plate in said base over said bulkhead intersections forming said hard spots, and b. means for attaching said plate of brass in said recess in said base upper plate between said base and said lower rail segments whereby the deleterious effects of said hard spots on said bearings are minimized by an overall reduction in stiffness.

9. In a method for minimizing the effect of hard spots on bearing rollers in a mining machine frame having a steel base, including upper and lower plates, supporting a steel rotating frame, including upper and lower plates, on a bearing roller circle, said bearing roller circle comprising an upper segmented bearing rail attached to the underside of the lower plate of said rotating frame, a lower segmented bearing rail attached to the top surface of the upper plate of said base, a bearing assembly positioned between said upper and lower bearing rails for carrying said rotating frame, at least one annular steel bulkhead for strength rigidly attached to the top side of said lower plate of said upper surface of said rotating frame and congruent with said upper bearing rail, a plurality of second steel strengthening longitudinal and transverse bulkheads intersecting said at least one annular bulkhead, at least some of said intersections causing hard spots having deleterious effects on said bearing rollers, at least one additional annular steel strengthening bulkhead rigidly attached to the underside of the upper plate of said base and congruent with said lower rail assembly, and a plurality of third steel strengthening longitudinal and transverse bulkheads intersecting said at least one additional annular bulkhead, at least some of said intersections causing hard spots having deleterious effects on said bearing rollers, the improvement comprising the steps of:

a. positioning a bearing rail segment over each location of said intersecting bulkheads causing said hard spots, and b. positioning a plate of metal softer than said steel between at least some of said bearing rail segments and said bulkhead intersections whereby the deleterious effects of said hard spots on a bearing caused by said bulkhead intersections are minimized by an overall reduction of stiffness caused by said material.

10. A method as in claim 9 further including the step of forming said plate of brass.

11. A method as in claim 10 further including the step of mounting one of said plates between each of said rail segments and a corresponding bulkhead intersection causing a hard spot.

12. A method as in claim 11 further comprising the steps of:

a. forming a recess in said rail segments to be positioned over said bulkhead intersections causing said hard spots, and b. inserting said brass plate in said recess and rigidly attaching said brass plate to said rail segment whereby a reduced relatively stiffness between said hard spot and said bearing roller occurs.

13. A method as in claim 12 further comprising the step of attaching said brass plates to upper rail segments.

14. A method as in claim 12 further comprising the step of attaching said brass plates to lower rail segments.

15. A method as in claim 11 further comprising the steps of:

a. forming a recess in said underside of said lower plate in said rotating frame over said bulkhead intersections forming said hard spots, and b. mounting said plate of brass in said recess between said lower plate of rotating frame and said upper rail segments whereby the deleterious effects of said hard spot on said bearings are minimized by an overall reduction in stiffness.

16. A method as in claim 11 further comprising the steps of:

a. forming a recess in said top surface of said upper plate in said base over said bulkhead intersections forming said hard spots, and b. attaching said plate of brass in said recess in said base upper plate between said base and said lower rail segments whereby the deleterious effects of said hard spots on said bearings are minimized by an overall reduction in stiffness.

* * * * *